United States Patent [19]

Plunkett et al.

[11] 4,255,695

[45] Mar. 10, 1981

[54] METHOD AND APPARATUS FOR CONTROL OF INVERTER SYNCHRONOUS MACHINE DRIVE SYSTEM

[75] Inventors: Allan B. Plunkett; Fred G. Turnbull, both of Scotia, N.Y.

[73] Assignee: General Electric Company, Schenectady, N.Y.

[21] Appl. No.: 945,625

[22] Filed: Sep. 25, 1978

[51] Int. Cl.³ .......................... H02P 1/46; H02P 7/42
[52] U.S. Cl. ................................... 318/723; 318/802; 318/807
[58] Field of Search ............... 318/720, 721, 722, 723, 318/793, 799, 800, 801, 802, 807, 810, 811

[56] References Cited

U.S. PATENT DOCUMENTS

| | | | |
|---|---|---|---|
| 3,368,133 | 2/1968 | Zenner | 318/801 |
| 3,482,157 | 12/1969 | Borden | 318/722 |
| 3,619,750 | 11/1971 | Mokrytzki et al. | 318/798 |
| 3,667,012 | 5/1972 | Kilgore | 318/800 X |
| 3,896,348 | 7/1975 | Loderer | 318/798 X |
| 4,080,554 | 3/1978 | Nordby | 318/798 X |
| 4,158,163 | 6/1979 | Eriksen et al. | 318/798 |
| 4,186,334 | 1/1980 | Hirata | 318/811 X |

FOREIGN PATENT DOCUMENTS

| | | | |
|---|---|---|---|
| 2302620 | 10/1976 | France | 318/721 |
| 1193979 | 6/1970 | United Kingdom | 318/798 |

*Primary Examiner*—J. V. Truhe
*Assistant Examiner*—Richard M. Moose
*Attorney, Agent, or Firm*—William H. Steinberg; James C. Davis, Jr.; Paul R. Webb, II

[57] ABSTRACT

In an inverter-synchronous machine drive system subject to operator control, feedback control is employed to synchronize machine-inverter operation. A phase angle command signal, responsive to a fixed value phase angle signal during initial machine excitation and alternately responsive to machine load variation as controlled by an operator command, is generated and compared against the actual machine phase angle difference between machine phase current and air gap flux. A frequency command signal, responsive to the angle difference therebetween, is impressed on the inverter to vary machine excitation responsive to the magnitude of the phase angle difference.

14 Claims, 6 Drawing Figures

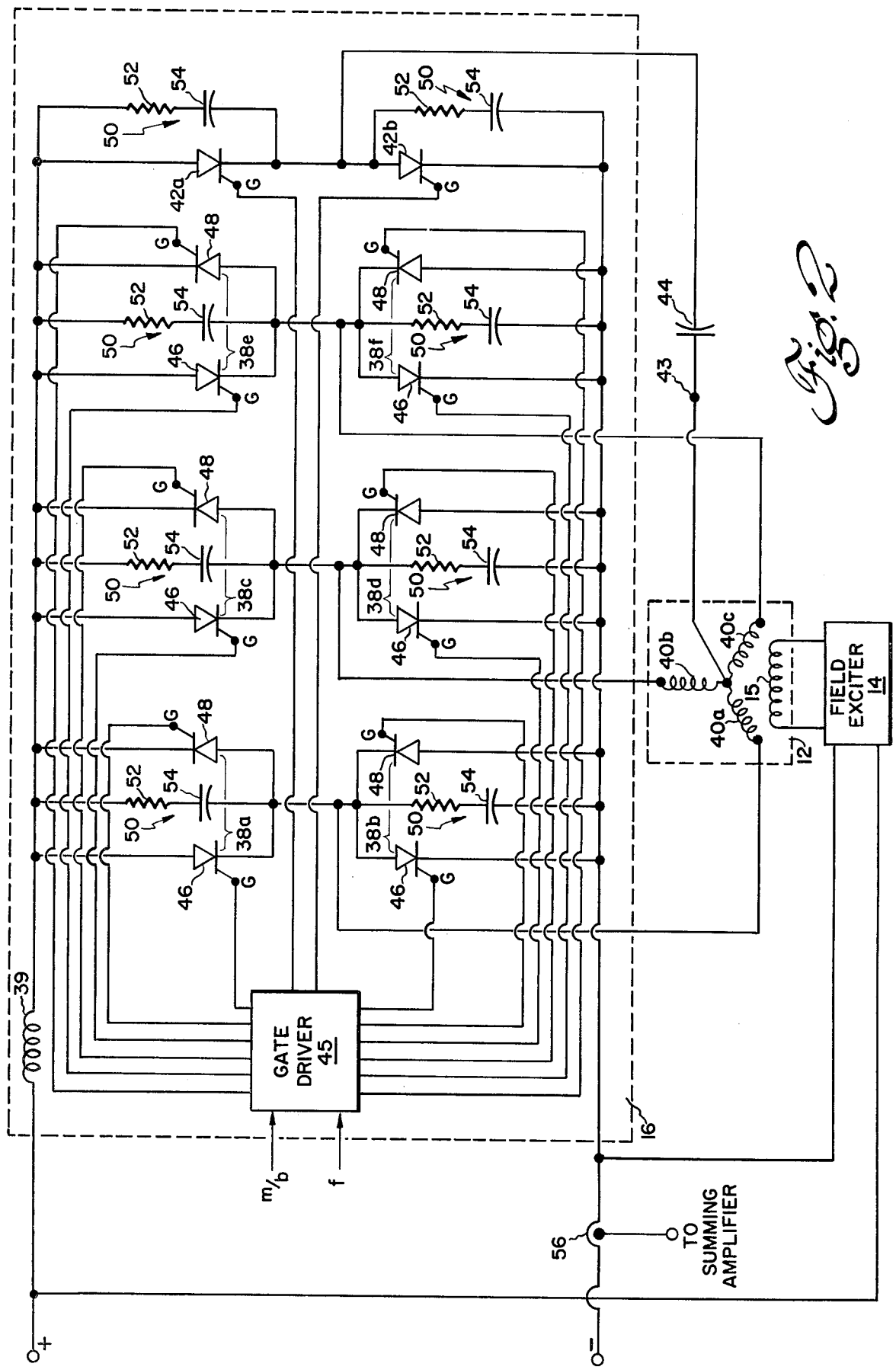

METHOD AND APPARATUS FOR CONTROL OF INVERTER SYNCHRONOUS MACHINE DRIVE SYSTEM

BACKGROUND OF THE INVENTION

This invention relates to a method and apparatus for control of a load commutated inverter-synchronous machine drive system, and more specifically, to a method and apparatus for control of a synchronous machine drive system without utilizing a shaft position sensor, as more fully described in our corresponding paper "Load Commutated Inverter Synchronous Motor Drive Without a Shaft Position Sensor" published in the Conference Record of the IEEE-IAS Conference in Los Angeles, Calif. in October 1977.

Inverter synchronous machine drive systems, to which the present invention is directed, are typically comprised of a synchronous machine, which may be of the inductor type, excited by variable frequency alternating voltage produced by an inverter from a source of direct current potential. The inverter used in such systems is typically comprised of a plurality of pairs of serially connected controlled unidirectional conduction means, such as a thyristor, corresponding in number to the number of machine phases. Each pair of thyristors is coupled in parallel across a DC source and is connected at the junction therebetween to a corresponding machine phase for controlling current conduction therein. When gated in a preselected sequence, the thyristors will conduct in a manner to provide alternating current of varying phase for machine excitation.

Inverter synchronous machine drive systems, such as described above, are presently enjoying renewed popularity in certain applications such as flywheel energy storage for electric vehicles. An important reason for such renewed popularity is that such machine drive systems may be made self-commutating, that is to say, that inverter thyristors may be extinguished by back electromotive force generated by the synchronous machine during operation, thus eliminating the need for large external commutating components.

To insure full machine performance under load, it is often important to synchronize the inverter-machine drive system, and, to adjust inverter thyristor gating intervals to vary the frequency of machine excitation in response to machine load variation.

In the past, various approaches have been disclosed to provide machine-inverter synchronization. In U.S. Pat. No. 3,796,935 issued Mar. 12, 1974 to Felix Blaschke and assigned to Siemens Aktiengesellschaft of Germany, machine inverter synchronization is provided by a pair of Hall generator probes for sensing machine shaft position coupled to appropriate associated feedback circuitry for generating a feedback angle command signal to vary inverter thyristor firing responsive to machine shaft position. A major disadvantage present within the apparatus of Blaschke is that machine shaft position, representing the actual machine phase angle, is sensed by Hall generator probes and thus requires machine modification for accommodation therein.

Still another approach for stabilizing an inverter-synchronous machine drive system is disclosed in U.S. Pat. No. 4,088,934, issued May 9, 1978 to J. D. D'Atre et al., and assigned to the assignee of the present invention. D'Atre et al. achieve machine-inverter synchronization by first deriving torque and angle signals representing the actual machine torque and phase angle, respectively. The actual torque and phase angle signals are compared to a torque command and subsequently-generated phase angle command signal, and a resulting feedback error signal, representing the magnitude of the difference therebetween, is impressed on the inverter for adjusting inverter thyristor gating intervals accordingly. Although the necessity for Hall probe or shaft position sensors, as taught by Blaschke, is eliminated, special function generators are required to generate appropriate torque and phase angle command signals for adjusting inverter firing. Additionally, D'Atre et al. do not employ apparatus for synchronizing an inverter-synchronous machine subject to operator-commanded load variation. The present invention does not require a shaft position sensor or special function generators to achieve synchronization, and provides inverter-synchronous machine synchronization in response to operator-commanded load variation.

SUMMARY OF THE INVENTION

Briefly, in accordance with a preferred embodiment of the invention, an improved method for controlling an inverter-synchronous machine drive system comprises the steps of generating a phase angle command signal which is responsive to a fixed value phase angle signal during intervals of initial machine excitation and is alternately responsive to operator-commanded load variation during time intervals other than those of initial excitation. The phase angle command signal is compared to a signal representing the actual phase angle difference between machine air gap flux and phase current, and a frequency command signal, responsive in magnitude to the angle difference therebetween, is generated. Machine excitation is varied in response to the frequency command signal to synchronize the inverter-synchronous machine drive system.

In accordance with another preferred embodiment of the invention, apparatus for controlling an inverter-synchronous machine drive system comprises means for generating a phase angle command signal which is responsive to a fixed phase angle value during time intervals of initial machine excitation and is responsive to operator-commanded load variation during time intervals other than initial machine excitation. Comparator means are coupled between the means for generating a phase angle command signal and means to measure the actual machine phase angle for comparing the machine phase angle command signal to a signal representing the actual derived machine phase angle and for providing a net angle error signal in accordance with the magnitude of the signal difference therebetween. Means for generating a frequency command signal, responsive to the net angle error signal, to vary the frequency of alternating voltage produced by the inverter for exciting the machine, are connected to the comparator means.

It is an object of the present invention to provide a control system for an inverter-synchronous machine drive system having automatic adjustment of inverter gating intervals for varying the frequency of machine excitation in response to operator commanded load variation.

It is a further object of the present invention to provide a control system for an inverter-synchronous machine drive system that allows rapid synchronization of the inverter to the synchronous machine during initial machine excitation intervals.

BRIEF DESCRIPTION OF THE DRAWINGS

The features of the invention believed to be novel are set forth with particularity in the appended claims. The invention itself, however, both as to organization and mode of operation, together with further objects and advantages thereof, may best be understood by reference to the following description taken in conjunction with the accompanying drawings in which:

FIG. 2 is a schematic representation of the inverter-synchronous machine as shown in FIG. 1;

DETAILED DESCRIPTION OF THE PREFERRED EMBODIMENT

Figure 1:
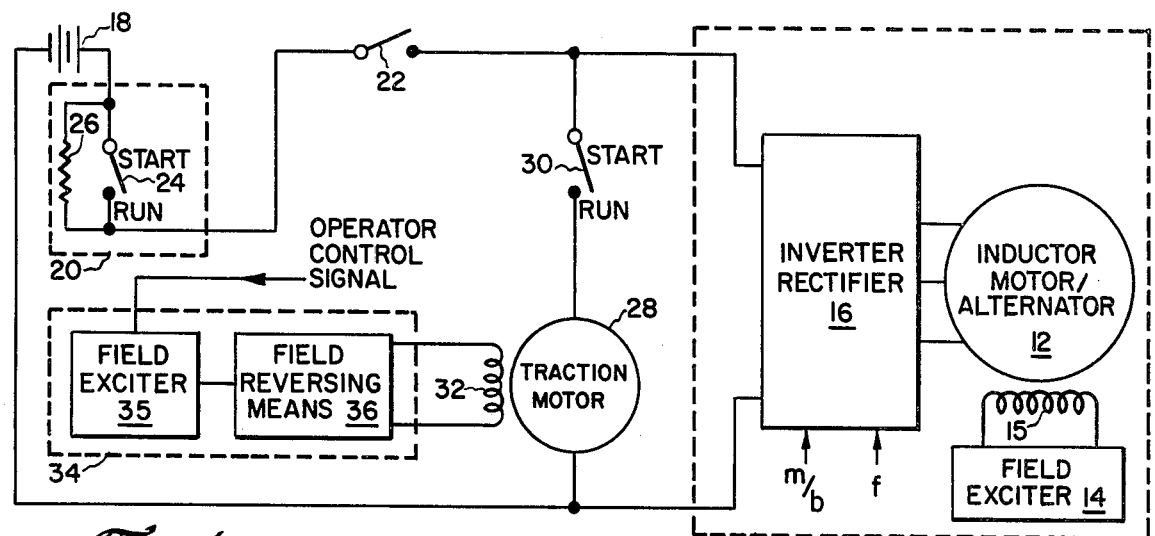
FIG. 1 is a general block diagram of the inverter-synchronous machine drive system specifically adapted for flywheel storage electric vehicles.

In FIG. 1, there is shown a block diagram of an electric vehicle drive system including an inverter-synchronous machine drive system 10, specifically adapted for flywheel energy storage. Inverter-synchronous machine drive system 10 comprises an inductor motor/alternator 12 together with a field exciter 14 for exciting the field 15 thereof, and an inverter/rectifier 16, hereinafter identified simply as inverter 16. A flywheel (not shown) is mechanically coupled to the rotating shaft of motor/alternator 12.

Inverter 16 is coupled between a source of direct current potential, shown as battery 18, and motor/alternator 12, for supplying variable frequency alternating current potential for motor excitation when mechanical energy is to be generated for flywheel energy storage. Alternately, inverter 16 acts as a rectifier to convert, to direct current potential, the alternating current potential generated by motor/alternator 12 when flywheel energy is to be converted into electrical energy. The specific construction and operation of inverter-synchronous machine 10 will be more fully described below, particularly with reference to the schematic representation thereof as shown in FIG. 2.

The serial combination of starter 20 and battery contactor switch 22 connected as shown in FIG. 1, between inverter 16 and battery 18, serve to limit and interrupt, respectively, the DC link current supplied from battery 18. Battery contactor 22 serves to interrupt the entire inverter DC link current drawn from battery 18 while starter 20, comprised of the parallel combination of switch 24 and resistance 26, serves to attenuate the DC link current through resistor 26 during initial machine excitation intervals to prevent current surge.

The electric vehicle drive system as shown in FIG. 1 further includes the serial combination of traction motor 28 and start-run switch 30 connected across the input of inverter 16. The field windings 32 of traction motor 28 are excited by exciter means 34, comprised of field exciter 35 driving field reversing means 36 in response to an operator control signal. Field reversing means 36, when excited by field exciter 35 allows the direction of rotation of traction motor 28 to be reversed, when desired, by reversing the potential applied to field windings 32.

Referring now to FIG. 2, inverter 16 is typically comprised of a plurality of pairs of serially-connected controlled bidirectional conduction means, corresponding in number to the number of phases of the synchronous machine, coupled in parallel across a source of DC to control current conduction in the corresponding respective phases thereof. Thus, for three-phase motor/alternator 12, three pairs of serially-connected controlled bidirectional conduction means, 38a and 38b, 38c and 38d and 38e and 38f, are coupled in parallel to form a network which is connected in series with inductor 39 which is coupled to battery 18 of FIG. 1. Each pair of serially-connected controlled bidirectional conduction means 38a and 38b, 38c and 38d, and 38e and 38f, respectively, is connected at its respective pair junction to the corresponding phases 40a, 40b, and 40c, respectively, of motor/alternator 12. Inductor 39 serves to smooth direct current supplied from battery 18 of FIG. 1 to inverter 16. A pair of controlled unidirectional conduction means 42a and 42b are serially coupled in parallel across each of the serially-connected pairs of controlled bidirectional conduction means 38a and 38b, 38c and 38d and 38e and 38f, respectively, and controlled unidirectional conduction means 42a and 42b are connected at the junction therebetween to the neutral terminal 43 of motor/alternator 12 through a commutating capacitor 44. As will be explained hereinafter, controlled-unidirectional conduction means 42a and 42b together with controlled bidirectonal conduction means 38a through 38f, when gated into conduction in a preselected manner, provide forced machine commutation which initially excites motor/alternator 12 from rest.

Each of controlled bidirectional conduction means 38a–38f, together with each of controlled unidirectional conduction means 42a and 42b, conducts current in response to a gate control signal impressed thereon, respectively, from gate driver 45. Gate driver 45, in turn, is responsive to motor/brake and frequency input signals impressed at the corresponding respective inputs (m/b and f, respectively) therefor. Various circuit embodiments for gate driver 45 exist and are well known in the art. Therefore the details of gate driver 45 are not shown herein. For a more detailed discussion of various thyristor firing circuits, reference should be had to Chapter 4 of *The General Electric Silicon Controlled Rectifier Handbook* published by Semiconductor Products Division, General Electric Company, Syracuse, N.Y., 1972. A gate driver circuit manufactured by General Electric Company, D.C. Motor Generator Products Department, Erie, Pa., referenced under catalog #36C72856AB has been found to be particularly well suited for such use.

Each of controlled bidirectional conduction means 38a through 38f is typically comprised of a pair of thyristors 46 and 48 coupled in parallel-opposition. Controlled unidirectional conduction means 42a and 42b are each comprised of a single thyristor. As will be explained in further detail below, a thyristor 46 within each upper and lower combination of bidirectional conduction means 38a, 38c and 38e and 38b, 38d, and 38f, respectively, when gated into conduction by a gate control signal impressed at the gate terminal G thereof from gate driver 45, conducts current to the corresponding respective phases 40a, 40b and 40c, respectively, of motor/alternator 12 during normal motoring intervals. Correspondingly, thyristor 48 within each upper and lower combination of bidirectional conduction means 38a, 38c, and 38e and 38b, 38d and 38f, respectively, serves, when gated into conduction, to rectify alternating current produced by motor/alternator 12 during generating intervals.

Each of controlled bidirectional conduction means 38a through 38f and controlled unidirectional conduction means 42a and 42b, respectively, includes filter means 50 coupled thereacross. Filter means 50 comprises the serial combination of a resistance 52 and a capacitor 54, and serves to filter high voltage pulses generated during inverter and rectifier operation, thereby reducing thyristor stress.

Current sensing means 56, is coupled between inverter 16 and battery 18 and produces a signal of varying amplitude in response to the amplitude of link current drawn by inverter 16.

Field exciter 14, coupled to battery 18, of FIG. 1 energizes field coil 15 contained within motor/alternator 12 in order to provide the appropriate DC field for machine operation.

Figure 3:
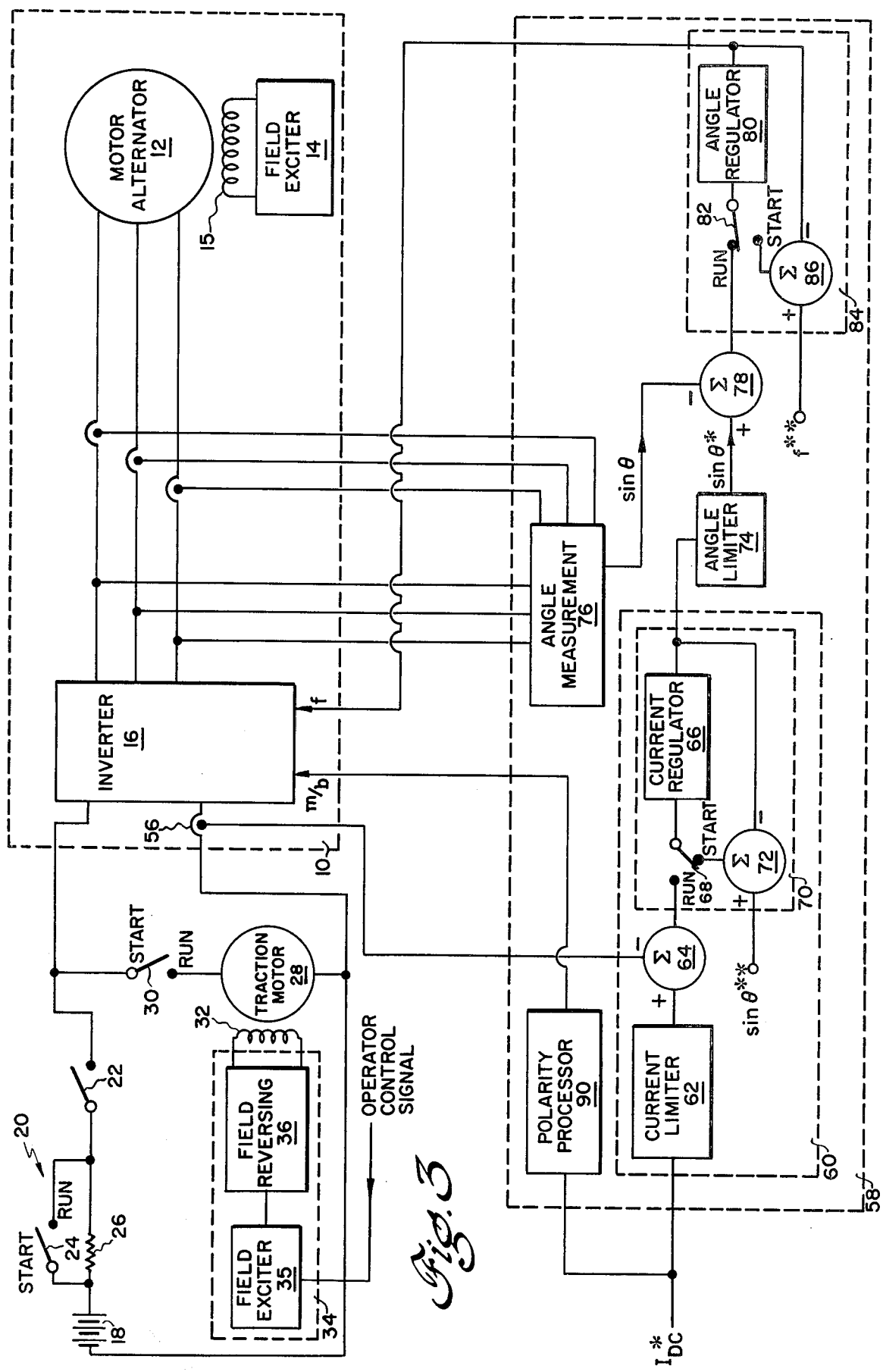
FIG. 3 is a detailed block diagram of the control apparatus of the present invention coupled to the inverter-synchronous machine drive system of FIG. 1.

FIG. 3 is a detailed block diagram of the apparatus 20 for controlling the inverter-synchronous machine drive system 10 shown in FIG. 1. A controller 58 includes a first outer control loop 60 for generating a phase angle command signal corresponding to a desired machine phase angle value in response to an operator-commanded machine load variation. A current command signal $I_{DC}*$, representing an operator command for a desired inverter current level (corresponding to a desired machine load), is supplied to the input of a current limiter 62. Current limiter 62 limits the current command signal so that the maximum permissible inverter link current level will not be exceeded for the desired operator-commanded current level. The current command signal at the output of current limiter 62 is impressed at the first input of a summing amplifier 64 while the second input thereto is coupled to current sensor 56. Summing amplifier 64 serves to provide, at the output terminal thereof, an intermediate current level signal responsive to the magnitude of the difference between the operator-commanded current level $I_{DC}*$ and the link current amplitude drawn by inverter 16.

Current regulator means 66 is coupled through a switch 68 to the output of summing amplifier 64 or into a second control loop 70 and generates a machine phase angle command signal responsive to the intermediate current level signal when switch 68 is in the "run" position. Inner control loop 70 is designed with relatively high gain so that, when the loop is completed through switch 68 (in the "start" position), a desired fixed value phase angle signal for initial machine excitation is produced by current regulator 66. The fixed value phase angle command signal, sin $\theta$, representing the desired machine phase angle between phase current and air gap flux for initial machine start-up, is impressed at the first input of a summing amplifier 72 while the second corresponding input thereof is connected to the output of current regulator 66 so as to complete a feedback loop about the current regulator. Under these conditions, a signal representing the difference between sin $\theta$ and the output of current regulator 66 is impressed at the input thereof, and a zero steady-state error phase angle command signal sin $\theta*$ is produced at the output thereof.

Current regulator 66 is comprised of an amplifier having an integral plus proportional transfer characteristic. Various amplifier circuits having integral plus proportional transfer characteristics exist, and selection of such a circuit will depend upon design parameters. The details of current regulator 66 are therefore not shown. For a more detailed explanation of amplifiers having integral plus proportional transfer characteristics, reference should be had to the text *Servomechanisms and Regulating System Design* by Chestnut and Mayer (John Wiley & Sons, 1955) at pages 121–125.

The output signal of current regulator 66 is limited by angle limiter 74 so that the desired machine phase angle sin $\theta*$ will not exceed a maximum allowable value. An angle measurement means 76, receiving phase current and line voltage signals, respectively, obtained from the phase current and line voltage, respectively, drawn by inductor motor/alternator 12, generates an output signal representing the actual machine phase angle between phase current and air gap flux. Various arrangements are available for deriving the actual machine phase angle, represented by sin $\theta$ from machine phase current and line voltage signals. One such arrangement is disclosed in the aforementioned J. D. D'Atre et al. U.S. Pat. No. 4,088,934. To the extent required for understanding of the operation of angle measurement means 76, that disclosure is herein incorporated by reference.

The output signal, sin $\theta$, of angle measurement means 76 is, in turn, algebraically summed at a summing amplifier 78 with the phase angle command signal, sin $\theta*$, such that a net angle error signal, representing the difference therebetween, will be provided at the output of amplifier 78.

The input of an angle regulator 80 is coupled through a switch 82 to the output of summing amplifier 78 when switch 82 is in the "run" position, and serves to generate a frequency command signal to vary the thyristor gating interval in inverter 16 in response to the phase angle command signal sin $\theta$.

Inner control loop 84 is designed with relatively high gain so that when the loop is completed through switch 82, a ramp start-up frequency command signal f is supplied to inverter 16 by angle regulator 80 to synchronize inverter-synchronous machine drive system 10. The slowly-increasing ramp start-up frequency command signal, initially of zero amplitude, is impressed on the first input of a summing amplifier 86 while the second input thereof is coupled to the output of angle regulator 80 to complete the loop thereabout. Under these conditions, a signal representing the difference in amplitude between f and the output signal of angle regulator 80, is impressed at the input thereof.

Angle regulator 80 preferably comprises an amplifier having an integral plus proportional transfer characteristic such that it produces a zero steady-state error frequency command signal when its input receives the output signal of summing amplifier 86, representing the difference between the machine start-up frequency signal f** and the frequency command signal produced by angle regulator 80. This provides high gain for feedback loop 84.

A polarity processor 90, coupled to receive the current command signal $I_{DC}*$, generates a corresponding digital motor/brake signal in response to the polarity of signal $I_{DC}*$. The digital motor/brake signal is received by gate driver 45, shown in FIG. 2, causing bidirectional conduction means 38a–38f to invert or rectify accordingly. Such polarity processor circuits are well known in the art and the details thereof are not shown. For a further, more detailed, analysis of such polarity processor circuits, reference should be made to chapter F, pages 165-173 of *Linear Integrated Circuits Application Handbook,* Fairchild Semiconductor Corp., 1967.

Operation of the inverter-synchronous machine 10 coupled to the control apparatus 58 of the invention, as shown in FIGS. 1, 2 and 3, will now be described. Initially, it will be assumed that inductor motor/alternator 12 is at rest and battery contactor switch 22 is open so that zero link current is drawn from battery 18 by inverter 16. To energize motor/alternator 12, causing flywheel rotation to start, battery contactor 22 is closed while switches 24, 30 and 68 are switched into their respective "start" positions. A fixed-value phase angle command signal sin $\theta^{}$, is combined with the output of current regulator 66 (initially zero) such that a signal representing the difference therebetween is impressed at the input thereto. Control loop 70, having high gain, causes current regulator 66 to substantially instantaneously generate a phase angle command signal substantially equal to the fixed-value phase angle signal sin $\theta^{}$. The fixed phase angle command signal generated at the output of current regulator 66 is limited by angle limiter 74 such that a maximum allowable machine phase angle value is not exceeded at the output of angle limiter 74. The output of angle limiter 74 is compared against the actual machine phase angle signal generated by angle measurement means 76 and a net angle error signal representing the difference therebetween, is provided at the output of summing amplifier 78. In response to the output signal of summing amplifier 78, angle regulator 80 supplies a frequency command signal to the corresponding frequency input f of gate driver 45 as shown in FIG. 2, gate driver 45 having been previously commanded to "invert" by polarity processor 90. The frequency command signal thus impressed at the frequency input f of gate driver 45 causes the gate driver to gate thyristor 46 of controlled bidirectional conduction means 38a-38f together with auxiliary thyristors 42a and 42b, respectively, to provide three phase current conduction into machine phases 40a, 40b, and 40c, respectively, in a manner identical to current conduction through a conventional three phase bridge inverter circuit during forced commutation intervals. For a further, more detailed description of three phase bridge inverter circuits, reference should be had to the text *Static Power Frequency Changers* by L. Gyugyi and B. R. Pelly, (Wiley Interscience, 1976) at pages 19-24. As motor/alternator 12 increases in rotational speed above a critical speed, (i.e. the speed at which back EMF is sufficient to commutate thyristors 46), gate driver 45 allows thyristors 42a and 42b to remain extinguished and continues to gate thyristors 46 in the sequence as described above, the same now being commutated by back EMF.

As noted above, during this interval of initial machine excitation, switch 82 remains in the "run" position, causing angle regulator 80 to produce a frequency command signal in response to the phase angle command signal at the output of summing amplifier 78. Motor/alternator 12 can alternatively be synchronized to inverter 16 during initial excitation intervals by actuating switch 82 to the "start" position in place of switch 68. By coupling angle regulator means 80 to the output of summing amplifier 86 a slowly increasing frequency command signal f, representing machine start-up frequency, is applied to the frequency input f of gate driver 45. The slowly increasing frequency command signal f permits open loop machine start-up to a preselected speed, at which speed, the inverter gating sequence frequency, as controlled by gate driver 45, then becomes the same as previously described.

Once inductor motor/alternator 12 has been initially excited, switches 24, 68 and 82 are each actuated to the "run" position, rendering motor/alternator 12 responsive to operator commanded load variations. This may be seen as follows. It will be assumed for purposes of this discussion that motor/alternator 12 is excited, but at a rotational frequency less than a desired load condition. To adjust the speed of motor/alternator 12 to correspond to a desired machine load, a current command signal $I_{DC^*}$, representing an operator command for a desired machine excitation, is supplied to the input of current limiter 62. The current command signal, thus limited, is compared at summing amplifier 64 with the actual DC link current via current sensor 57, so that a signal, representing the current difference therebetween, is supplied to the input of current regulator 66, which, in response, generates a phase angle command signal. The phase angle command signal sin $\theta^*$, limited by angle limiter 74, is compared, at summing amplifier 78 with a signal representing the actual machine phase angle sin$\theta$, and a signal, representing the angle difference therebetween, is impressed at the input of angle regulator 80 which generates a frequency command signal in response thereto. Gate driver 45 varies the inverter gating intervals in accordance with the frequency command signal, thus varying the frequency of machine excitation to achieve to the desired machine speed.

Figure 4A:
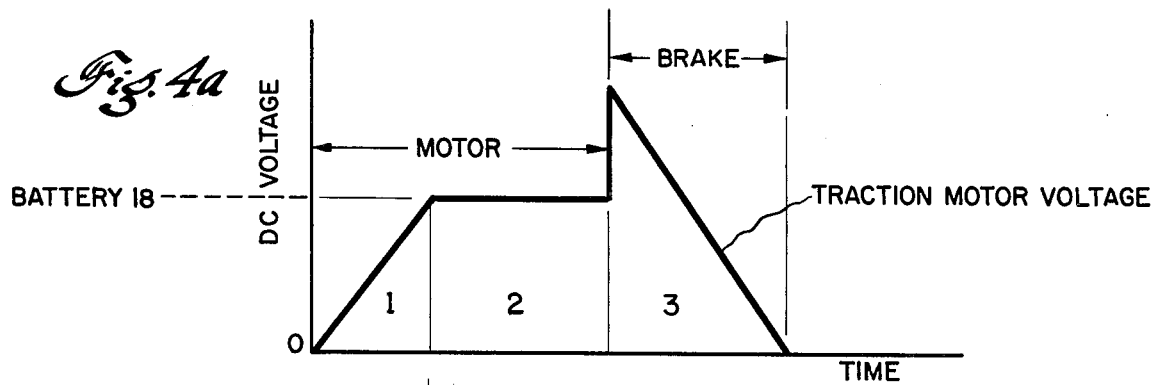
FIGS. 4a, 4b and 4c are graphic representations, respectively, of DC voltages, DC currents, and flywheel speed when the apparatus of FIGS. 1 through 3 is adapted for use in propelling an electric vehicle.
Figure 4B:
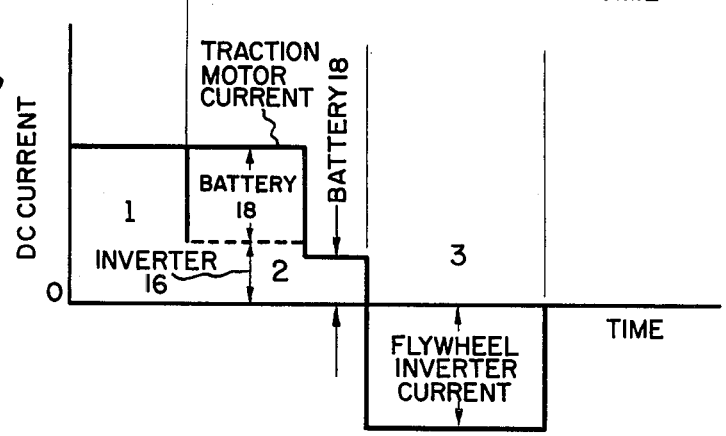
Figure 4C:

Operation of the inverter-synchronous machine drive system 10 for a flywheel storage electric vehicle may be understood by reference to FIGS. 4a, 4b and 4c. Thus, the voltage across traction motor 28 as shown in FIGS. 1 and 3, when switch 30 is actuated to the run position, is represented as a function of time in FIG. 4a while the corresponding DC current drawn thereby, as a function of time, is represented in FIG. 4b. When battery contactor 22 is open and switch 30 is thrown into the "run" position, corresponding to initial vehicle motion from rest, voltage across traction motor 28 increases linearly with respect to time until it reaches the voltage amplitude of battery 18. This is represented by mode 1 in FIG. 4a. As shown in FIG. 4b, the corresponding DC current drawn by traction motor 28 during this interval, being supplied from inverter 16 (not acting in the rectifier mode) is constant as a result of kinetic flywheel energy being converted into electrical energy by motor/alternator 12.

During mode 2 (battery contactor 22 closed) field exciter 35, shown in FIGS. 1 and 3, controls the armature current of traction motor 28 by weakening the field thereof as vehicle speed increases in response to an operator control signal impressed thereon. During this time, although the voltage across traction motor 28 remains constant and equal to voltage of battery 18, as shown in FIG. 4a, the rectified current supplied by inverter 16 decreases correspondingly, the balance of current drawn by traction motor 28 being supplied from battery 18 as indicated in FIG. 4b. When a constant speed is attained, traction motor current is supplied only from the battery, but at a reduced level as shown in FIG. 4b.

During the braking interval (battery contactor 22 open) (mode 3), when speed of traction motor 28 is about to be reduced, a peak DC voltage level is initially present thereacross because traction motor 28 acts as a generator during this interval. Inverter 16 now correspondingly operates in the inverter mode, thus serving to return vehicle kinetic energy (less losses) into the flywheel. The traction motor current becomes negative, due to generator action of traction motor 28.

The flywheel speed, as a function of time during modes 1 through 3, is represented in FIG. 4c and remains relatively constant. Flywheel speed decreases slightly with increasing traction motor speed during modes 1 and 2, as a result of mechanical energy conversion into electrical energy by motor/alternator 12, while flywheel speed increases during the braking interval (mode 3) when energy is returned to the flywheel by conversion of electrical energy into mechanical energy.

The foregoing describes a control system for an inverter synchronous machine drive system having automatic adjustment of inverter gating intervals for varying the frequency of machine excitation in response to operator-commanded load variation. The control system allows rapid synchronization of the inverter to the synchronous machine during initial machine excitation intervals.

While only certain preferred features of the invention have been shown by way of illustration, many modifications and changes will occur to those skilled in the art. For example, although the control system of the present invention has been described in relation to a flywheel energy storage system for an electric vehicle, it may be equally useful in other applications employing an inverter-synchronous machine drive system. It is, therefore, to be understood that the appended claims are intended to cover all such modifications and changes as fall within the true spirit of the invention.

What is claimed is:

1. An improved method for controlling a synchronous machine excited by variable frequency alternating voltage produced by an inverter, said method comprising the steps of:
   (a) generating a phase angle command signal which is responsive to a fixed phase angle value during initial machine excitation intervals and is responsive to operator-commanded variation during other than initial machine excitation intervals;
   (b) generating a frequency command signal proportional in magnitude to the angle difference between said phase angle command signal and a signal representing the actual phase angle difference between the machine air gap flux and current; and
   (c) varying excitation of said synchronous machine in response to said frequency command signal.

2. The method of claim 1 wherein the step of generating said frequency command signal proportional in magnitude to the angle difference between the phase angle command signal and a signal representing the actual phase angle difference between machine air gap flux and current occurs at intervals other than during initial machine excitation.

3. The method of claim 1 wherein the step of generating said phase angle command signal during intervals other than initial machine excitation comprises algebraically summing an operator-commanded current level signal with a signal representing actual DC inverter link current and producing a signal responsive to the magnitude of difference therebetween.

4. The method of claim 3 including the step of limiting said operator-commanded current level signal below a preselected maximum allowable inverter link current level prior to algebraic summation with said signal representing actual DC inverter link current.

5. The method of claim 1 including the step of limiting said phase angle command signal so as not to exceed a preselected machine phase angle value.

6. An improved method for controlling a synchronous machine excited from variable frequency alternating voltage supplied from an inverter, said method comprising the steps of:
   (a) generating a frequency command signal in response to a start-up machine frequency signal during initial machine excitation intervals
   (b) generating a phase angle command signal which is responsive to operator-commanded variation during other than initial machine excitation intervals;
   (c) generating a frequency command signal proportional in magnitude to the angle difference between said phase angle command signal and a signal representing the actual phase angle difference between the machine air gap flux and current during time intervals other than said initial machine excitation intervals; and
   (d) varying the frequency of said variable frequency alternating voltage in response to said frequency command signal.

7. For use with an inverter-synchronous machine drive system including a synchronous machine, a source of variable frequency alternating voltage for exciting said machine, and means coupled to said machine for generating a signal representing the actual phase angle difference between machine air gap flux and current signals, improved apparatus for controlling said synchronous machine comprising:
   (a) means to generate a phase angle command signal in response to a preselected fixed value machine phase angle during intervals of initial machine excitation and in response to operator commanded load variation during time intervals other than said initial machine excitation intervals;
   (b) comparator means coupled to said means to generate a phase angle command signal and to said means for generating a signal representative of the actual phase angle difference between machine air gap flux and current for providing a signal according to the difference therebetween; and
   (c) angle regulator means coupled to said comparator means for generating a frequency command signal, said angle regulator means being coupled to said variable frequency alternating voltage source for varying the frequency thereof.

8. The apparatus of claim 7 wherein said means to generate a phase angle command signal comprises:
   (a) a first summing amplifier having a first input coupled to receive an operator-commanded current level signal and a second input coupled to receive a signal responsive to the input link current drawn by said variable frequency alternating voltage source, said first summing amplifier providing an error signal at the output thereof responsive to the amplitude difference between signals at the first and second inputs thereof;
   (b) current regulator means for providing a phase angle command signal in response to an input signal received thereby; and
   (c) second summing amplifier having a first input adapted to receive a fixed value phase angle command signal and a second input coupled to the output of said current regulator means, the input of said current regulator means being connected to the output of said second summing amplifier during intervals of initial machine excitation and to the output of said first summing amplifier during intervals other than said initial machine excitation intervals, for generating a phase angle command signal responsive to the corresponding output signals of said first and said second summing amplifiers, respectively.

9. The apparatus of claim 8 wherein said current regulator means comprises an amplifier having an integral plus proportional transfer characteristics.

10. The apparatus of claim 8 including current limiter means connected to said first input of said first summing amplifier for limiting said operator-commanded current level signal to below a predetermined maximum current level.

11. The apparatus of claim 8 including angle limiter means coupled to the output of said current regulator means for limiting the phase angle command signal generated by said current regulator means to below a predetermined maximum allowable angle value.

12. The apparatus of claim 7 including:
 (a) a summing amplifier having a first input adapted to receive a machine start-up frequency signal and a second input coupled to the output of said angle regulator means; and
 (b) switching means for coupling the input of said angle regulator means to the output of said summing amplifier during intervals of initial machine excitation and to the output of said comparator means during intervals other than initial machine excitation intervals.

13. The apparatus of claim 7 wherein said angle regulator means comprises an amplifier having an integral plus proportional transfer characteristic.

14. The invention according to claim 7 wherein said comparator means comprises a summing amplifier.

* * * * *